Oct. 29, 1940.  D. R. BRADSHAW  2,219,410
DOUGHNUT MACHINE
Filed Oct. 30, 1939  2 Sheets-Sheet 1
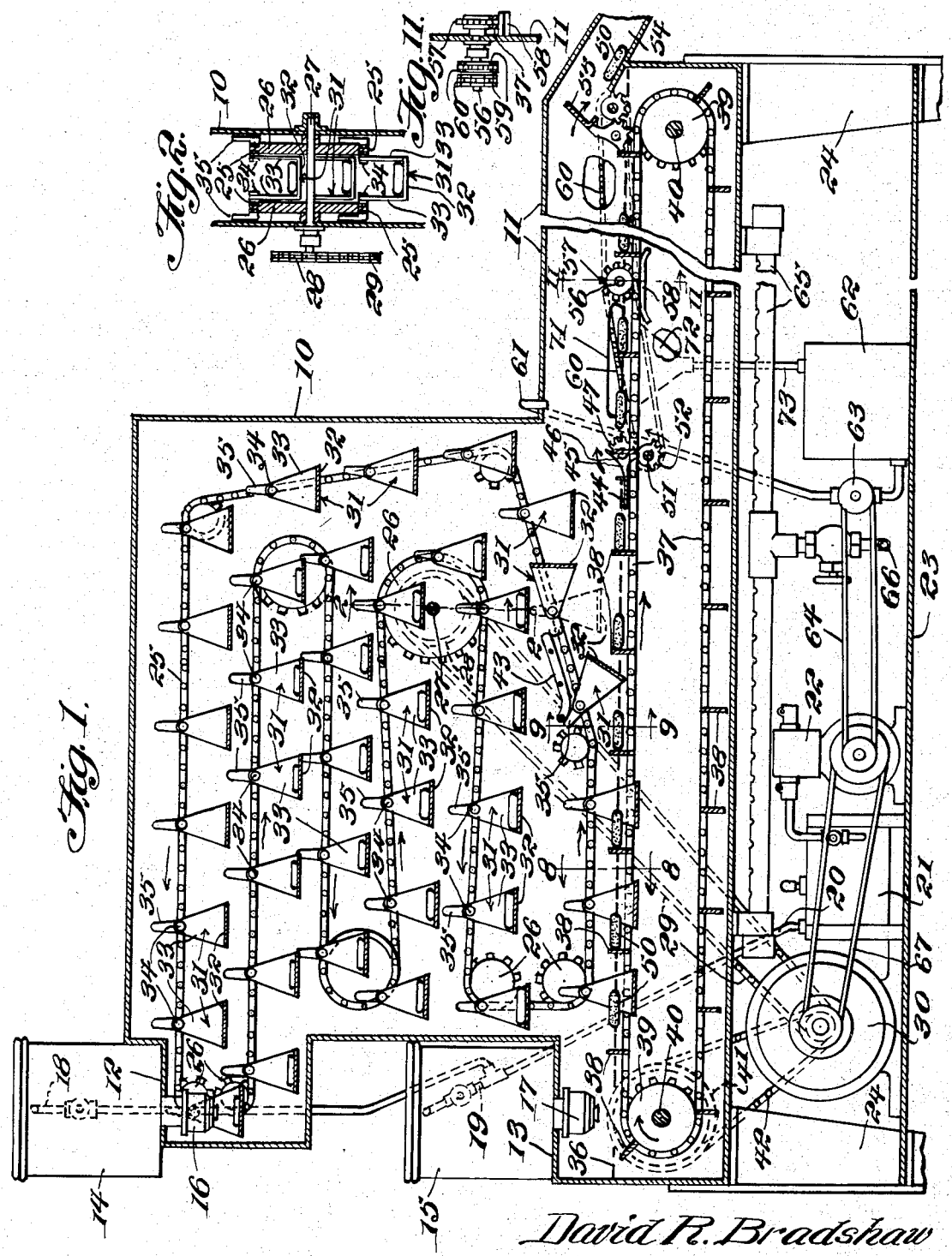
David R. Bradshaw
INVENTOR
BY Victor J. Evans & Co.
ATTORNEYS
WITNESS J. L. Wright

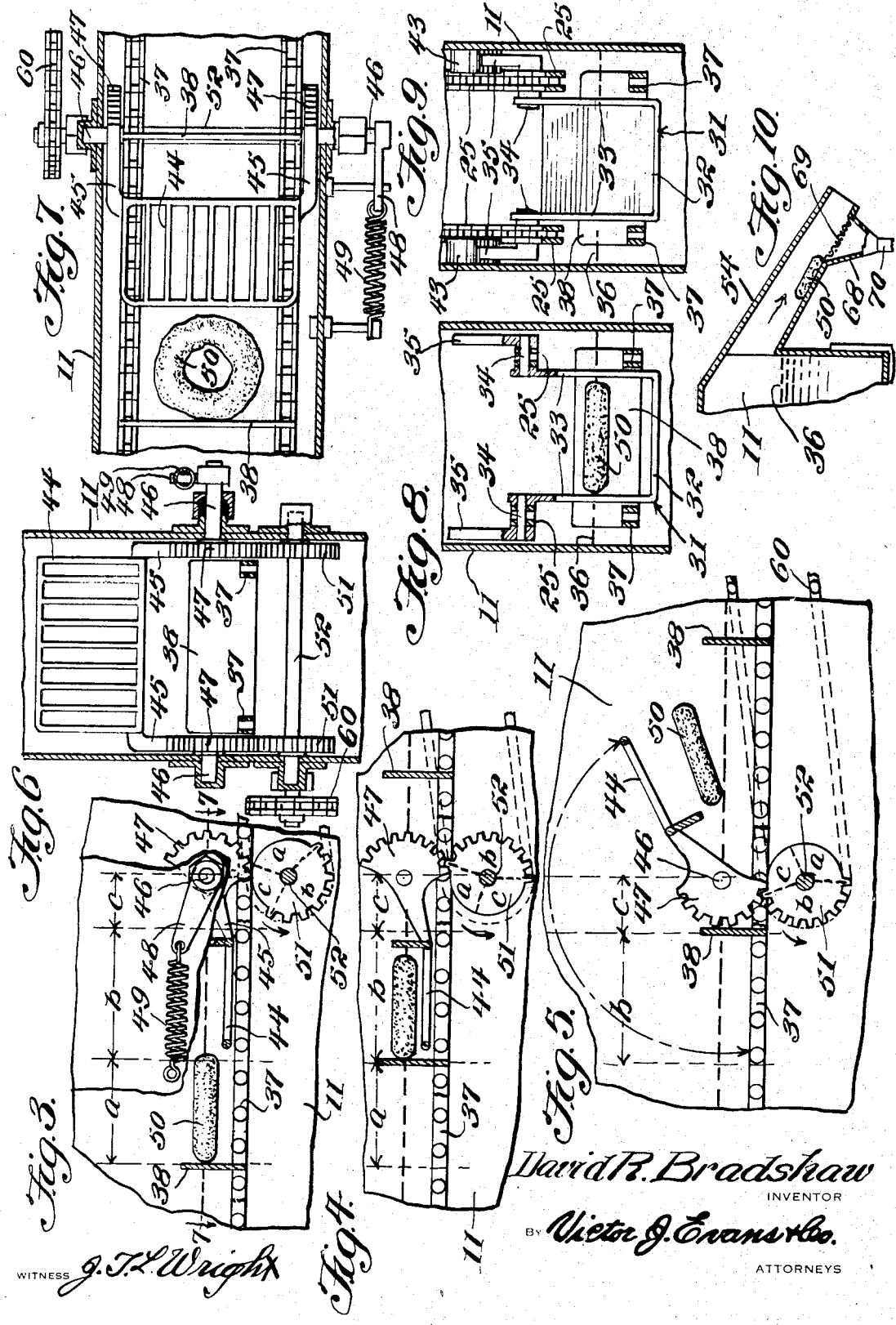

Patented Oct. 29, 1940

2,219,410

UNITED STATES PATENT OFFICE 2,219,410

DOUGHNUT MACHINE

David Robert Bradshaw, Birmingham, Ala.

Application October 30, 1939, Serial No. 302,046

3 Claims. (Cl. 53—7)

This invention relates to doughnut machines and has for an object to provide a machine of this character having two separate stations or points where the dough hopper may be connected depending on whether or not the dough is to be proofed during its travelling between the hopper and hot grease.

A further object of the invention is to provide in a machine of this character means for pushing the pivoted doughnut carrier plates from underneath the doughnuts after a pre-determined distance of their travel through the hot grease to permit the vanes on the submerged conveyer to carry the doughnuts to the exit trough.

A further object is to provide novel means in a machine of this character for flipping a doughnut, cooked on one side by the hot grease, over on the other side to be cooked on the other side.

A further object is to provide means in a machine of this type for removing the doughnuts, when cooked, from the vanes on the submerged conveyer, onto the delivery trough.

A further object is to provide a machine of this character which will be formed of a few strong, simple and durable parts, which will be inexpensive to manufacture and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming a part of this specification:

Figure 1 is a longitudinal sectional view of a doughnut machine constructed in accordance with the invention, with parts in elevation.

Figure 2 is a cross sectional view taken on the line 2—2 of Figure 1 showing the heating chamber for proofing the doughnuts, and showing the doughnut carrying plates therein.

Figure 3 is a detail longitudinal sectional view of the doughnut flipper in normal position.

Figure 4 is a longitudinal view of the doughnut cooker in position to turn over the doughnut.

Figure 5 is a longitudinal sectional view of the doughnut flipper showing the same in final position of flipping the doughnut from one side to the other.

Figure 6 is a detail cross sectional view of the doughnut flipper as upper limit of arc of flipping movement.

Figure 7 is a cross sectional view of the doughnut flipper taken on the line 7—7 of Figure 3.

Figure 8 is a cross sectional view taken on the line 8—8 of Figure 1 showing one of the doughnut carrier plates.

Figure 9 is a cross sectional view taken on the line 9—9 of Figure 1.

Figure 10 is a detail longitudinally sectional view of the doughnut discharge trough showing the grease drain.

Figure 11 is a detail cross sectional view taken on the line 11—11 of Figure 1.

Referring now to the drawings in which like characters of reference designate similar parts in the various views, 10 designates the warming chamber and 11 the cooking chamber of the doughnut machine, both chambers having respective shelves 12 and 13 in superposed relation at one end for supporting respective dough receptacles 14 and 15. The upper dough receptacle receives dough containing yeast, which must rise or be "proofed" as it is called, during a certain time travel through the heating chamber 11 before being submerged in the hot grease to be cooked. The lower receptacle 15 receives cake dough which needs no yeast and may be submitted direct to the hot grease container.

Each of the receptacles is provided with respective doughnut dies 16 and 17 through which the dough is extruded by compressed air. Valve controlled compressed air pipes 18 and 19 enter the respective chambers near the top and communicate with an air pipe 20 which is connected to a compressed air tank 21 supplied by a conventional compressor 22, preferably located on a base plate 23 carried by legs 24 which support the cooking chamber 11.

An endless carrier is mounted in the warming chamber and comprises a pair of parallel endless chains 25 looped back and forth over respective gear wheels 26, best shown in Figure 2, a pair of the gear wheels being disposed in superposed relation underneath the doughnut forming die 16 of upper dough receptacle 14 and another pair of the gear wheels being disposed in superposed relation at the initial end of the top of the cooking chamber 11. The shaft 27 of one of the pair of the gear wheels is equipped with a driving gear 28 which is driven by a chain drive 29 from an electric motor 30 disposed on the base plate 23.

At intervals along the chains 25 doughnut carrier plates 31 are pivotally mounted. As best shown in Figures 2, 8 and 9 each carrier plate comprises a substantially rectangular base 32 from which rises substantially triangular side plates 33. At the apices of the side plates stub shafts 34 are fixed and pivotally extend through respective links of the chains 25. The stub shafts are equipped at the ends with respective crank arms 35.

As each doughnut carrier plate arrives in position underneath the doughnut die 16 of the upper dough receptacle 14 a formed doughnut is extruded onto the base 32 thereof. During travel of the chains 25 back and forth through the warming chamber 10, for a predetermined time period the dough, containing yeast, will be warmed and will rise. When the doughnut carrier plates arrive successively at the superposed gear wheels 26 in the entrance of the cooking chamber, each will be lowered into the cooking chamber below the surface of the hot grease 36 therein and the doughnut will float off the carrier plate onto the surface of the grease.

Disposed in the cooking chamber 11 is an endless conveyer comprising a pair of parallel endless chains 37, best shown in Figures 8 and 9, connected at intervals by transversely disposed carrier plates 38. The chains are trained over gear wheels 39, the shafts 40 of which are journaled in the sides of the cooking chamber 11. The shaft of one pair of gear wheels is terminally equipped with a drive gear 41 which is driven by a chain drive 42 from the electric motor 30.

The lower reach of the endless carrier in the warming chamber 10 and the upper reach of the endless conveyer in the cooking chamber 11 travel in the same direction, as indicated by the arrowheads in Figure 1, and at the same speed. Consequently after the doughnut has floated off a carrier plate 31 it will be met by an advancing carrier plate 38 of the endless conveyer and advanced toward the discharge end of the machine, being cooked on the lower side in the meantime.

After travelling a short distance along with the endless conveyer each doughnut carrier plate 31 is lifted out of the grease. For this purpose a pair of cam arms 43 having arcuate leading ends, as best shown in Figures 1 and 9, are bolted to the sides of the warming chamber at the top thereof in position to impinge against the crank arms 35 of the doughnut carrier plate 31 and rock the plate out of the grease on the stub shafts 34 as pivots.

The cam arms extend upwardly and obliquely relatively to the plane of the upper reach of the endless conveyer, and also the lower reach of the endless carrier is likewise inclined, so that the crank arms ride along these inclined portions of the cam arms and rock the doughnut carrier plate 31 of the endless carrier clear of the doughnut carrier plate 38 of the conveyer, as best shown in Figure 1. As the crank arms leave the cam arms the doughnut carrier plate 31 swings back to normal position to receive a doughnut when it arrives at the die 16, or die 17.

After travel in the hot grease for a predetermined time period to thoroughly cook the doughnut on one side it is flipped on to the other side and travels for a similar time period in the hot grease to be cooked on the other side before it is discharged from the machine. For turning over the doughnut a flipper is provided, as best shown in Figures 3 to 7, inclusive.

The flipper comprises a grid 44 which is attached to a pair of crank arms 45 which are spaced apart sufficiently to permit the doughnut carrier plates 38 of the conveyor to pass therebetween, as best shown in Figure 6. The arms are fixed to a rock shaft 46 which is journaled at the ends in the sides of the warming chamber 11 and is equipped at both ends with mutilated driving gears 47 having teeth for substantially one-half the periphery. The shaft 46 is equipped with a crank arm 48, best shown in Figure 3. A helical spring 49 is secured at one end to the side of the chamber and at the other end is secured to the crank arm. The spring normally holds the rock shaft 46 in position to dispose the grid 44 underneath an advancing doughnut 50.

A pair of mutilated gears 51 are fixed to a driven shaft 52 which is journaled in the sides of the warming chamber and is equipped at one end with a drive gear 53 which is driven by one of the endless conveyer chains 37 as will be presently described.

As indicated in Figures 3, 4 and 5, which show successive states of flipping a doughnut, the mutilated gears 47 and 51 are so timed that during travel of a doughnut 50 through the distance marked a in Figure 3, there will be no movement of the grid 44. The same is true while the doughnut is travelling through the distance marked b into a position above the grid, as shown in Figure 4. At this point the mutilated gears 51 have turned sufficiently to present the teeth thereof to mesh with the teeth of the mutilated gears 47 with resultant swinging of the grid upperly from the horizontal through an arc of about 135°, to flip the doughnut onto the other side, as shown in Figure 5. At this point the mutilated surface of the gears 51 advances onto the toothed surface of the mutilated gears 47 so that the teeth of both sets of mutilated gears are no longer in mesh and this permits the spring 49 to contract and swing the rock shaft 4 and grid 44 to normal position.

The doughnut is advanced in the hot grease by the conveyer in the cooking chamber toward a discharge chute 54, best shown in Figures 1 and 10. At the upper entrance end of the discharge chute a second flipper designated in general by numeral 55 is located in the path of the advancing doughnut. This flipper is a duplicate of the flipper previously described in detail and need not be further described except to say that after the doughnut has travelled in the grease sufficiently to be thoroughly cooked, the second flipper 55 operates to flip the doughnut into the chute for delivery and storage in any preferred manner.

For driving both flippers simultaneously a shaft 56 is journaled at the ends in the sides of the cooking chamber substantially midway between both flippers. The shaft is equipped with a driving gear 57 which is held in mesh with the upper reach of the conveyer 57 through the medium of a guide bar 58. The guide bar is located below the gear and the upper reach travels along the top face of the guide bar in mesh with the teeth of the driving gear 57. A pair of gears 59 are disposed on the shaft 56 and are connected by respective chain drives 60 with the driving gears 53 of the flippers.

The grease is supplied to the heating chamber through a supply pipe 61 which opens through the top of the chamber and which is connected at the bottom to a grease supply tank 62 disposed on the base plate 21. A pump 63 is located in the supply pipe and is driven from the compressor through the medium of a belt drive 64.

The grease pumped into the cooking chamber is heated through the medium of a burner 65 which extends longitudinally of the bottom of the chamber and is connected to a valve controlled fuel supply pipe 66. The compressor 22 is driven from the electric motor 30 through a belt drive 67.

While sliding down the discharge chute 54 the cooked doughnut encounters a grease drain 68 which is screened at the top, as shown at 69. The grease drain is connected to the storage tank 62 through the medium of a pipe 70.

As will be seen by referring to Figure 1 a slot 71 is formed in the side of the cooking chamber 11 to maintain a pre-determined grease level therein. The slot communicates with a funnel 72 disposed on the upper end of an overflow pipe 70 which enters the top of the grease supply tank 62.

Since the operation of the device has been described as a description of the parts progress it is thought that the invention will be fully understood without further explanation.

What is claimed is:

1. In a doughnut machine, superposed proofing and hot grease cooking chambers, an endless carrier trained back and forth in the proofing chamber, an endless conveyer in the cooking chamber, means for selectively extruding doughnuts to the conveyer or to the carrier, doughnut carrying plates hinged to the carrier, transversely disposed doughnut carrying plates on the conveyer, means for driving the carrier and the conveyer at the same speed, means for pushing the doughnut carrying plates of the carrier from beneath the doughnuts after a pre-determined distance of their travel on the conveyer through the hot grease chamber, means for flipping the doughnuts from one side to the other during travel through the hot grease chamber, and means for discharging the doughnuts from the conveyer at the end of their travel through the hot grease chamber.

2. In a doughnut machine, superposed proofing and hot grease cooking chambers, an endless carrier in the proofing chamber, doughnut carrying plates hinged to the carrier and each having a crank arm projecting therefrom, an endless conveyer in the hot grease cooking chamber, transversely disposed doughnut carrying plates fixed to the conveyer between which the carrier plates of the endless carrier are received, a curved cam arm having an upwardly inclined straight end fixed to the proofing chamber, the curved portion of the cam arm impinging the crank arm of each doughnut carrying plate of the endless carrier successively and rocking the carrying plate out from between the carrier plates of the conveyer, means for driving the carrier and the conveyer at the same speed, means for flipping the doughnuts from one side to the other during travel through the hot grease chamber, and means for discharging the doughnuts from the conveyer at the end of their travel through the hot grease chamber.

3. In a doughnut machine, superposed proofing and hot grease cooking chambers, an endless carrier in the proofing chamber, doughnut carrying plates hinged to the carrier, an endless conveyer in the hot grease cooking chamber, transversely disposed doughnut carrying plates fixed to the conveyer between which the carrier plates of the endless carrier are received, means for pushing the hinged doughnut carrying plates of the carrier from beneath the doughnuts after a pre-determined distance of their travel on the conveyer through the hot grease chamber, means for driving the conveyer and the carrier at the same speed, a flipper having a grid pivotally mounted in the hot grease chamber and spring pressed to be disposed underneath the path of travel of the doughnuts in the conveyer, mutilated gear means timed to swing the flipper grid upwardly in an arc against the tension of the said spring and turn the doughnuts successively to inverted position during travel through the hot grease chamber, means for driving said mutilated gear means from the conveyer, and means for discharging the doughnuts from the conveyer at the end of their travel through the hot grease chamber.

DAVID ROBERT BRADSHAW.